United States Patent
Messineo et al.

(10) Patent No.: US 11,613,343 B1
(45) Date of Patent: Mar. 28, 2023

(54) UNMANNED FLYING WING AIRCRAFT HAVING FOLDABLE AND STACKABLE WINGS

(71) Applicant: Piasecki Aircraft Corporation, Essington, PA (US)

(72) Inventors: Christopher R Messineo, Claymont, DE (US); Brian R. Geiger, Philadelphia, PA (US); Jay Troy, Newark, DE (US); Stephen J Lash, Blackwood, NJ (US); Frederick W Piasecki, Haverford, PA (US)

( * ) Notice: Subject to any disclaimer, the term of this patent is extended or adjusted under 35 U.S.C. 154(b) by 199 days.

(21) Appl. No.: 16/926,387

(22) Filed: Jul. 10, 2020

Related U.S. Application Data

(60) Provisional application No. 62/873,433, filed on Jul. 12, 2019.

(51) Int. Cl.
| | | |
|---|---|---|
| *B64C 3/56* | (2006.01) | |
| *B64D 47/08* | (2006.01) | |
| *B64U 10/25* | (2023.01) | |
| *B64U 30/12* | (2023.01) | |
| *B64U 101/30* | (2023.01) | |

(52) U.S. Cl.
CPC ............... *B64C 3/56* (2013.01); *B64D 47/08* (2013.01); *B64U 10/25* (2023.01); *B64U 30/12* (2023.01); *B64U 2101/30* (2023.01)

(58) Field of Classification Search
CPC ............................ B64C 3/56; B64C 2201/102
See application file for complete search history.

(56) References Cited

U.S. PATENT DOCUMENTS

| | | | |
|---|---|---|---|
| 6,056,237 A | 5/2000 | Woodland | |
| 8,089,034 B2 | 1/2012 | Hammerquist | |
| 8,876,039 B2 | 11/2014 | Lubenow | |
| 9,789,950 B1 | 10/2017 | Most | |
| 2016/0122016 A1* | 5/2016 | Mintchev | B64C 39/024 244/17.23 |
| 2017/0369150 A1 | 12/2017 | Finklea | |

FOREIGN PATENT DOCUMENTS

| | | |
|---|---|---|
| CN | 103043214 | 4/2013 |
| CN | 103963958 | 8/2014 |
| CN | 104015933 | 9/2014 |
| CN | 105235891 | 1/2016 |

* cited by examiner

*Primary Examiner* — Jessica B Wong
(74) *Attorney, Agent, or Firm* — Robert J. Yarbrough; Lipton, Weinberger & Husick

(57) ABSTRACT

A foldable aerial vehicle may take the form of a flying wing. The flying wing includes port and starboard wings having port and starboard root and tip portions. The port and starboard root and tip portions are hinged one to another so that the span axes of all of the root and tip portions are parallel in the stowed condition and so that the tip portions are separated by the root portions in the deployed condition to define the flying wing. The wings are not symmetrical about the longitudinal axis of the vehicle, with the span axes of the root and tip portions being stepped from one wing tip to the other. Folding winglets are disposed on opposing wing tips, with the higher winglet extending in an upward direction and the lower winglet extending in the downward direction.

20 Claims, 13 Drawing Sheets

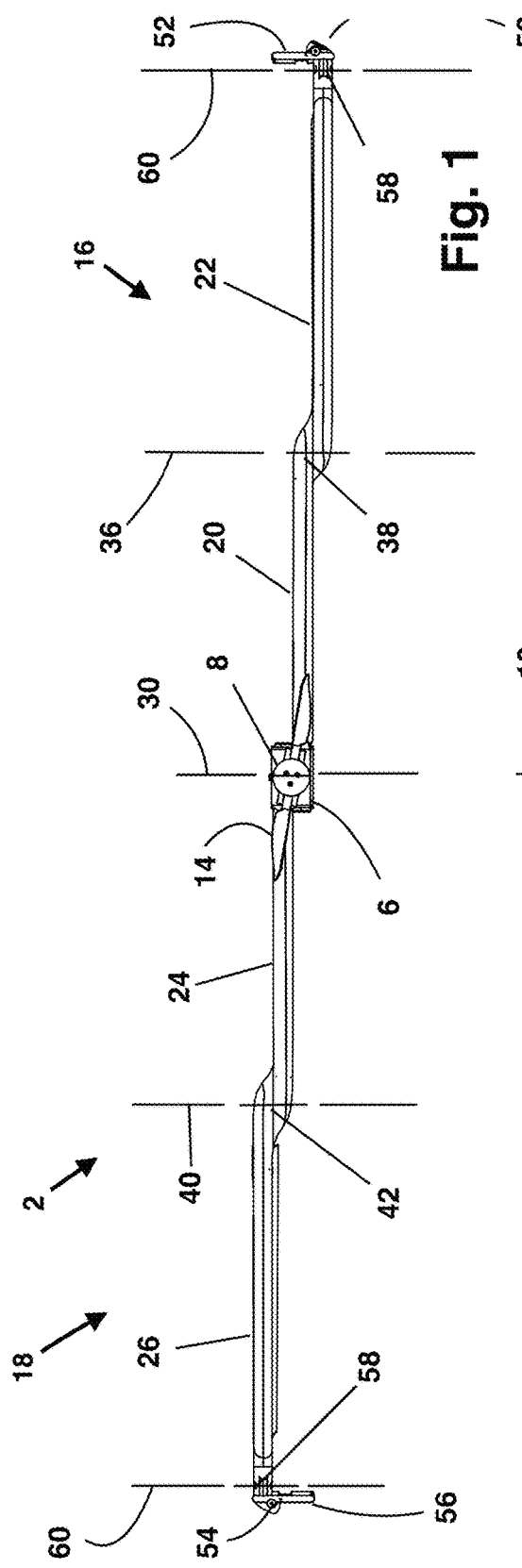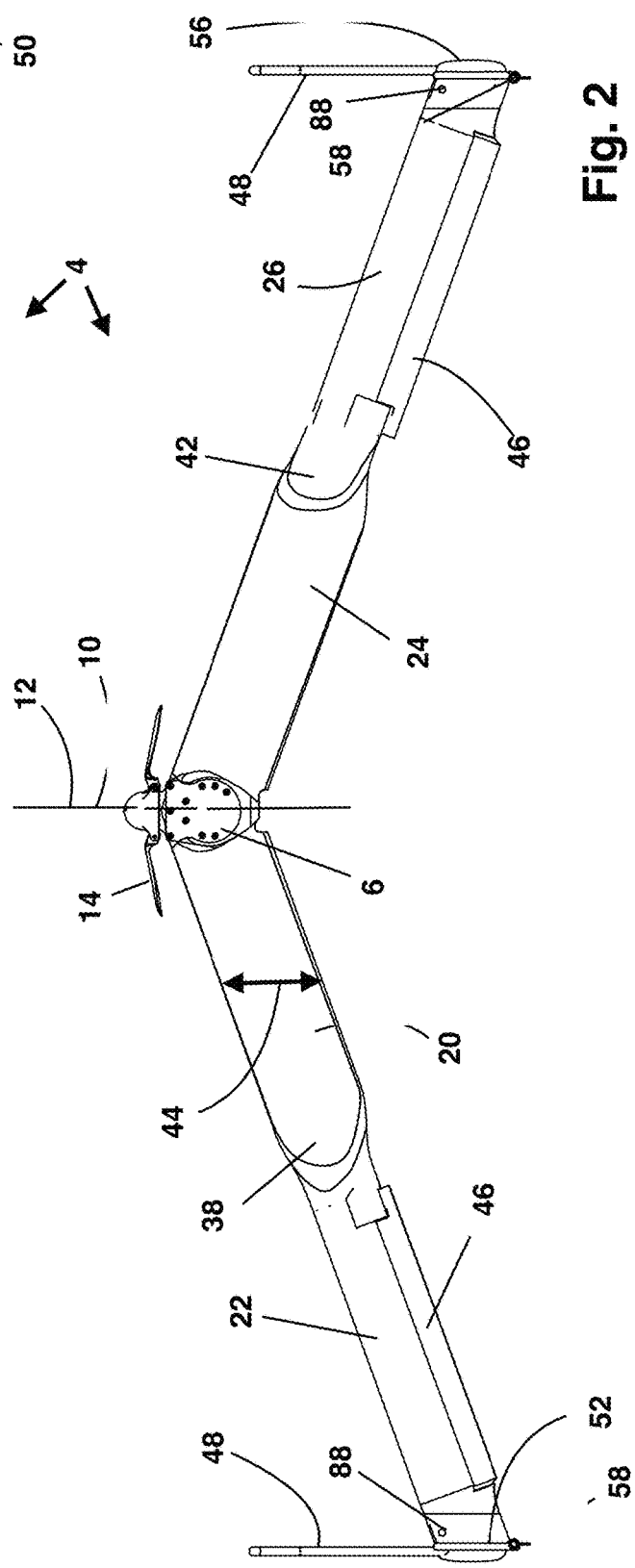

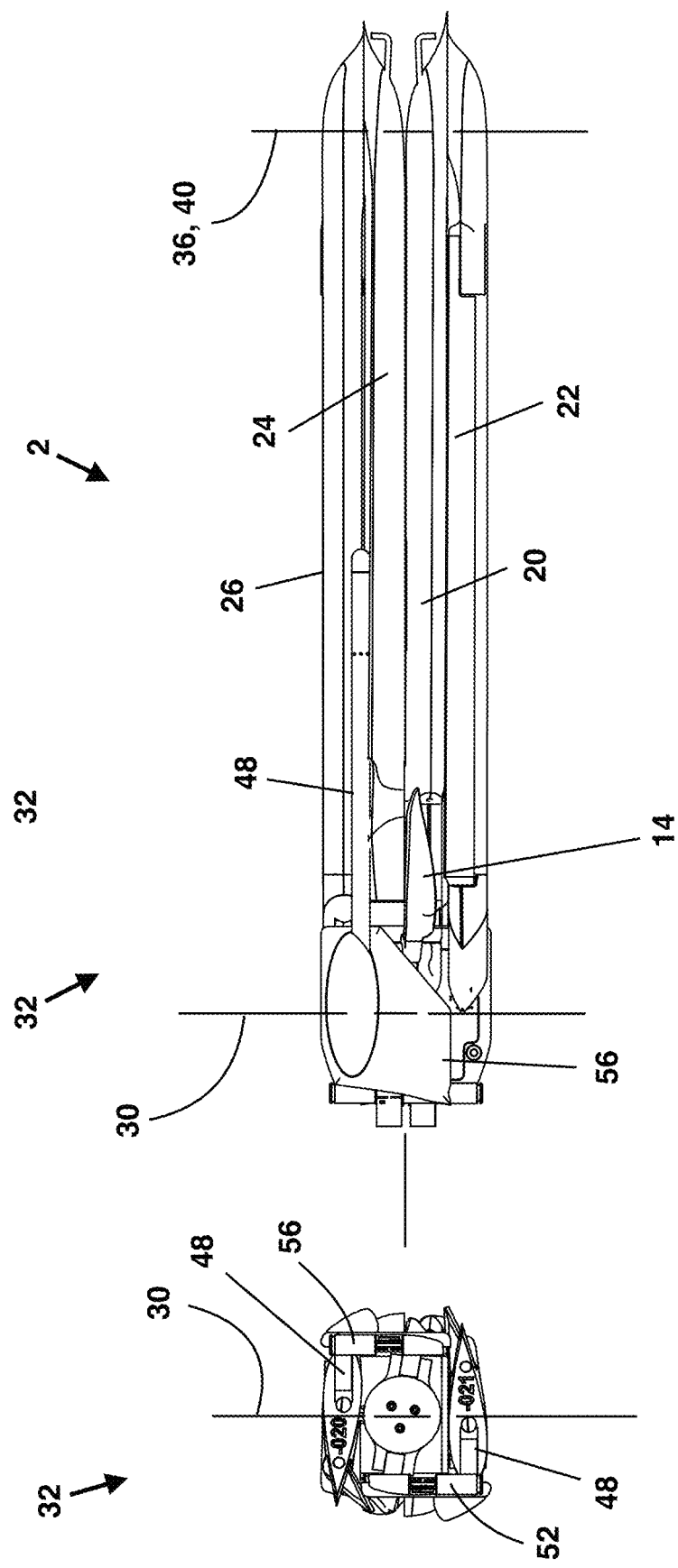

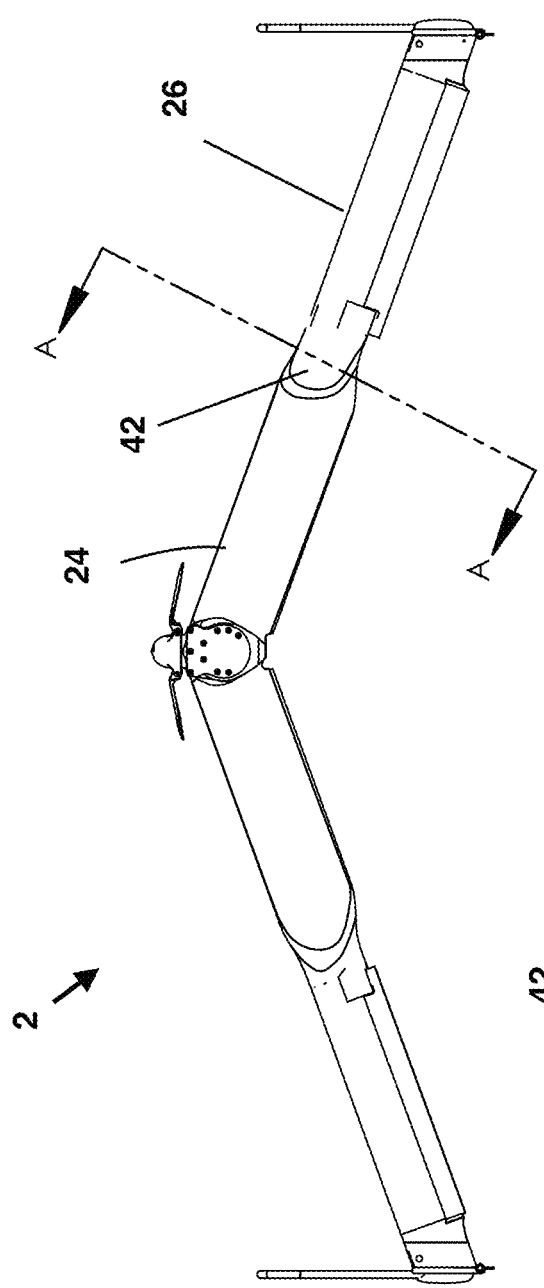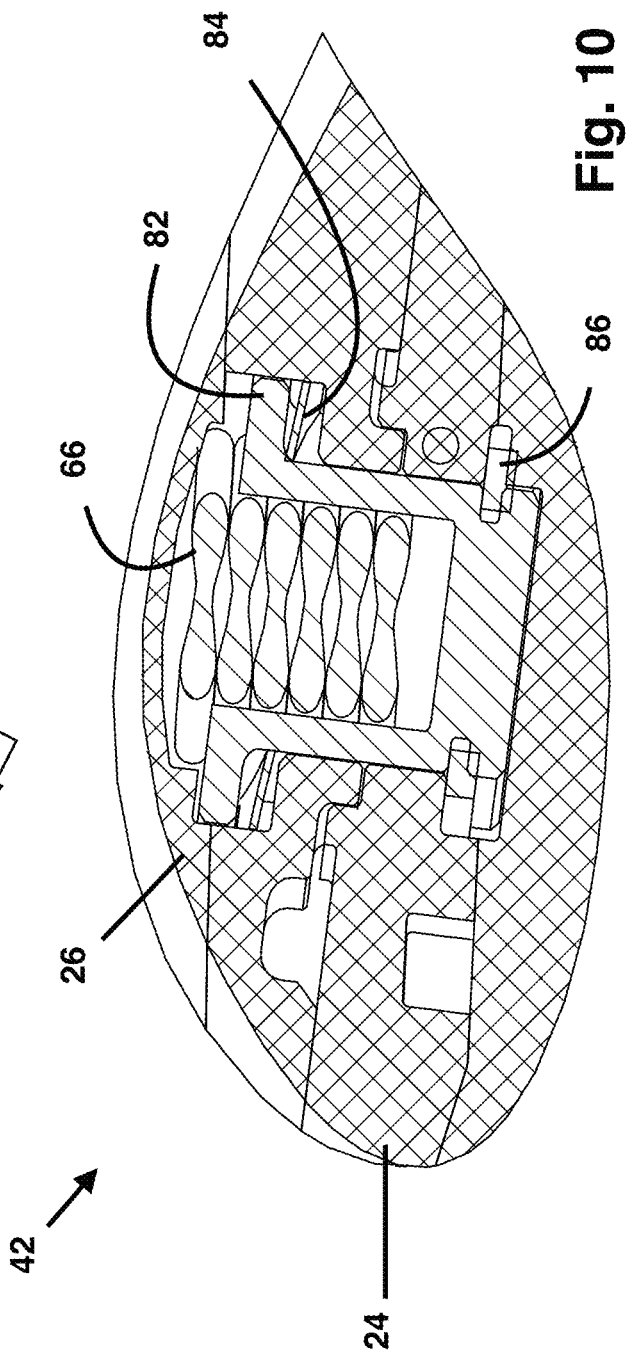

UNMANNED FLYING WING AIRCRAFT HAVING FOLDABLE AND STACKABLE WINGS

I. BACKGROUND OF THE INVENTION

A. Field of the Invention

The Invention is an unmanned aerial vehicle ('UAV') that is a foldable flying wing. The Invention is also a system and method of operating the foldable unmanned aerial vehicle. The foldable flying wing UAV is asymmetric and may be disposable. The UAV may be compactly stored and may be launched in a folded condition from an aircraft in flight. The folded wings of the collapsed UAV then will snap to the deployed position and the UAV may fly a predetermined flight pattern. The UAV is particularly useful for collecting and reporting meteorological measurements, as in conditions within a hurricane.

B. Statement of the Related Art

The U.S. National Oceanic and Atmospheric Administration ('NOAA') and the U.S. Air Force operate research aircraft that approach and fly through storms, up to and including hurricanes, to gather data relating to the storms. Certain of the aircraft originally were submarine hunters and are equipped with 'sonotubes,' originally used to launch sonar buoys during the Cold War to monitor submarines. Since the early 1970s, NOAA and the U.S. Air Force have used sonotubes to launch 'dropsondes' into storms over water. A dropsonde is an instrumented cylinder that collects data on time, location, height, temperature, dew point depression, and wind speed and wind direction. The dropsonde is equipped with a radio transmitter to send the data back to NOAA or other customers of the data. A small parachute slows the descent of the dropsonde through the storm to provide the dropsonde more time to collect and transmit data. The dropsonde falls for only a short time, usually 3 to 5 minutes, before it strikes the water. The dropsonde is expendable and is not recovered.

Data from the dropsonde is combined with data from floating driftsondes, from radiosondes held aloft by weather balloons, and from satellite data to inform weather predictions relating to the storm.

U.S. Pat. No. 6,056,237 issued May 2, 2000 to Woodland teaches a sonotube-launched UAV. Woodland does not teach the elements of the Invention.

II. BRIEF DESCRIPTION OF THE INVENTION

The Invention is a foldable flying wing UAV with a compact folded state. The UAV includes a nacelle housing an electric motor and defining a longitudinal axis of the UAV. The electric motor drives a propeller with the axis of rotation of the propeller coextensive with the longitudinal axis.

The UAV features foldable port and starboard wings that together with the nacelle define a V-shaped flying wing when the port and starboard wings are in the deployed condition. Each of the port and starboard wings defines a root portion and a tip portion. The root portions of the port and starboard wings are attached to the nacelle by a root hinge located at the root of the port and starboard wings. The root and tip portions of each of the port and starboard wings are joined together by a span hinge. The span hinge or hinges is (are) located along the span of the wing between the root and tip of the wing.

The span hinges and the root hinge allow the tip portions and root portions to pivot between a folded condition and a deployed condition so that the mathematical surfaces defined by the chords of the port and starboard wing root portions and tip portions are generally parallel in the deployed condition, in the folded condition, and in each condition between the deployed and folded conditions. The mathematical surfaces defined by the chords of the port and starboard root and tip portions are not completely parallel when in the deployed position because the tailless flying wing design may require twist along the span of the wings for pitch stability.

Because the UAV of the Invention has no tail and no elongated fuselage, UAV systems such as batteries to power the electric motor, avionics, meteorological sensors and other UAV systems may be housed in the wing portions, causing the wing portions to be thicker than would otherwise be the case. With the wings in the deployed position and with the UAV in the upright position with the span of the wings oriented generally orthogonal to the pull of gravity, the elevation of the starboard tip portion is higher than the starboard root portion, which is higher than the port root portion, which is higher than the port tip portion. As a result of the foregoing, the deployed port and starboard wings have a stepped, asymmetric appearance.

For purposes of clarity of explanation, the remainder of this document will describe the starboard tip portion as being higher than the port tip portion when the UAV is in straight and level coordinated flight. The description below applies equally to the alternate configuration of the port tip portion being higher than the starboard tip portion.

The root hinge and span hinges are equipped with resilient mechanisms to urge the root portions and tip portions to the deployed position. The resilient mechanisms may be coiled extension springs located within the leading edge of the root portions. The resilient mechanisms may be coiled torsion springs acting about the axis of rotation of the span hinges. Alternatively, the resilient mechanisms may be springs including tension springs, compression springs, torsion springs, flat springs, machined springs, serpentine springs, cantilever springs, coil springs, volute springs, leaf springs, negator springs, elastic bands, gas springs, or springs using any other technology The UAV may be stored in the folded condition in a cylindrical tube. When the UAV is pulled from the cylindrical tube, the resilient mechanisms urge the tip portions and root portions to rotate about the hinges and to move to the deployed position. Stops in the hinges prevent excessive movement of the root portions and tip portions.

The port and starboard tip portions may include winglets at the wing tips acting as vertical stabilizers and to reduce tip losses. For the starboard (higher) tip portion, the winglet extends downward from the tip. For the port (lower) tip portion, the winglet extends upward from the tip. The alternate directions for the orientation of the winglets presents a smaller cross section of the folded UAV and allows the folded UAV to fit within a cylindrical sonotube for launch and into a cylindrical tube for compact storage. The winglets may have a hinged connection about the wing tips and may be rotatable for compact storage and launch. The winglets may move to the deployed position from the folded position by inertia when the springs move the wing root portions and tip portions to the deployed condition from the folded condition. Magnets may secure the winglets in the deployed condition.

The electric batteries used to power UAV systems and the electric motor are housed in any available space, which may include within the wings. The UAV may include monitoring equipment to measure meteorological conditions and a radio transmitter to transmit the results of the measurements. The UAV may include a positioning system, such as global positioning system ('GPS') to indicate the location of the UAV. The wings may include ailerons and spoilers for stability and directional control. All of the UAV systems, including the electric motor, ailerons, radio transmitter and measuring equipment may be under the command of a control system. The control system may include a microprocessor and computer memory. The computer memory may store a pre-programmed flight path and may be configured to manipulate the ailerons and the electric motor so that the UAV follows the predetermined flight path.

The UAV may be stored in a tube and deployed from an aircraft through a sonotube mounted to the aircraft. After the UAV is dropped from the aircraft, a drogue parachute deploys, pulling the UAV from the tube. The resilient mechanism(s) motivate the port and starboard wing root portions and tip portions to the deployed position. The control system starts the motor, which turns a propeller. The propeller may be folding to allow compact storage. The control system controls the operation of the motor and ailerons to direct the UAV on the predetermined flight path. The monitoring equipment gathers meteorological data and position data and the radio transmits the data to a remote receiver.

Optionally, the UAV may be equipped with one or more cameras and may take still or video images. Rather than a radio transmitter, the UAV may be equipped with a radio receiver or transponder. The control system may be configured to receive commands from a remote transmitter or transponder and to execute the commands, as to control the flight of the UAV or to collect data using a sensor or a camera.

The UAV may be configured as single-use and disposable. Alternatively, the UAV may be configured to have a positive buoyancy so that the UAV will float on water. The radio transmitter or transponder may be configured to transmit a locator signal to allow the UAV to be located and recovered from the surface of the water.

III. BRIEF DESCRIPTION OF THE DRAWINGS

FIG. 1 is a front view of the UAV in the deployed condition.

FIG. 2 is a top view of the UAV is the deployed condition.

FIG. 3 is a front view of the UAV in the folded condition.

FIG. 4 is a side view of the UAV in the folded condition.

Figure 6:
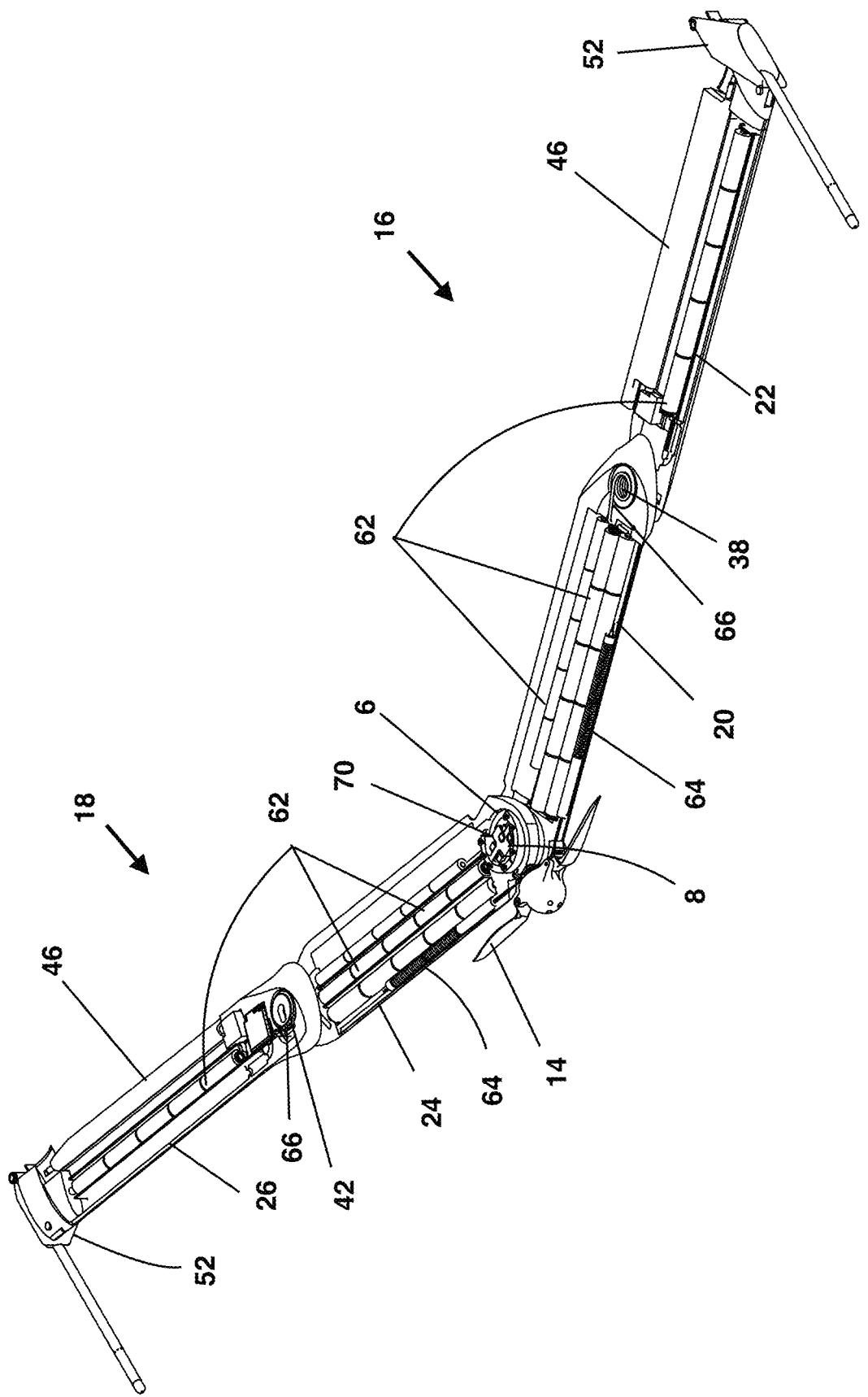

FIG. 6 partial cutaway perspective view of the UAV in the deployed condition.

Figure 7:
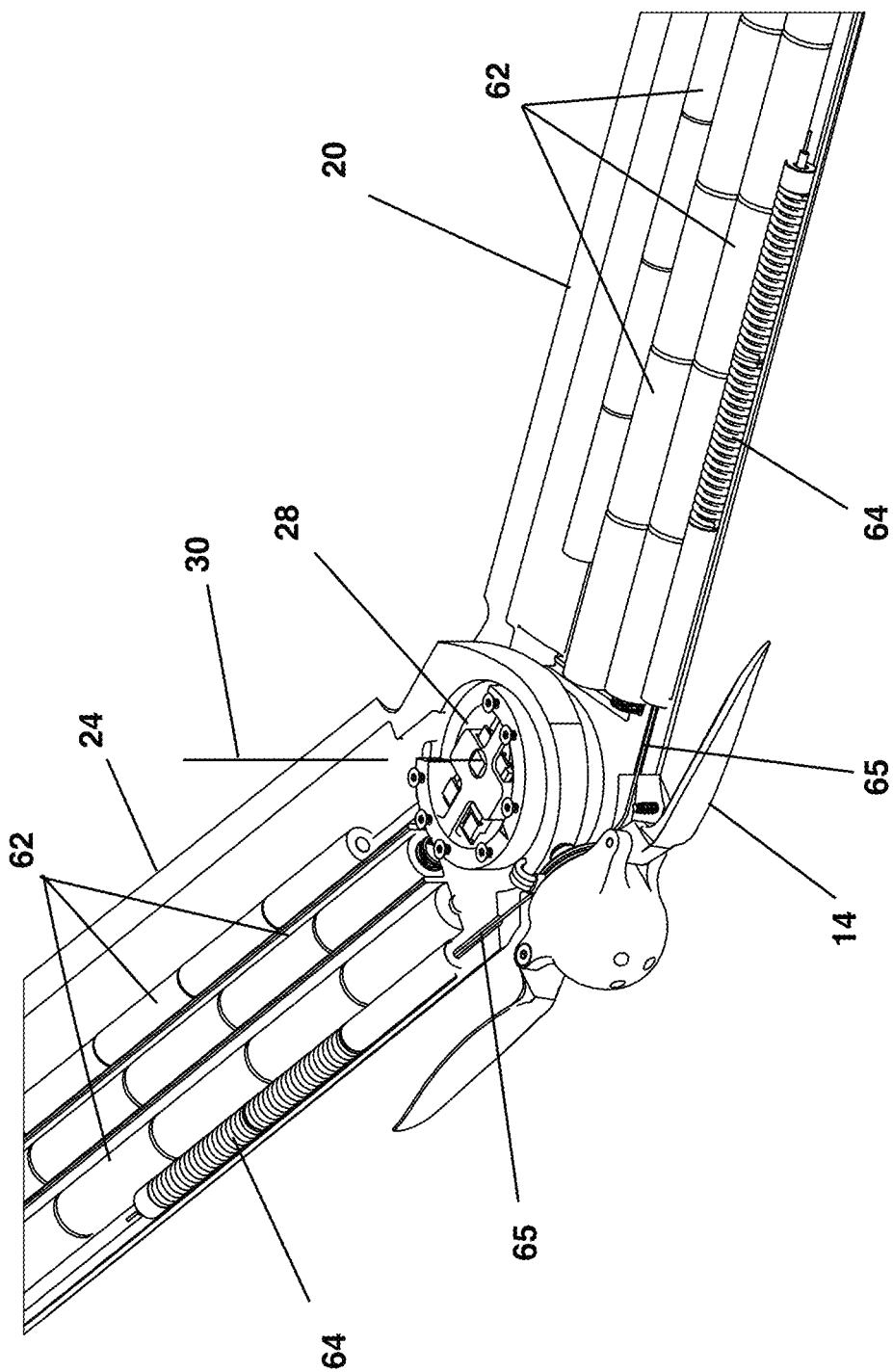

FIG. 7 is a detail cutaway view of nacelle, port root portion and starboard root portion.

Figure 8:
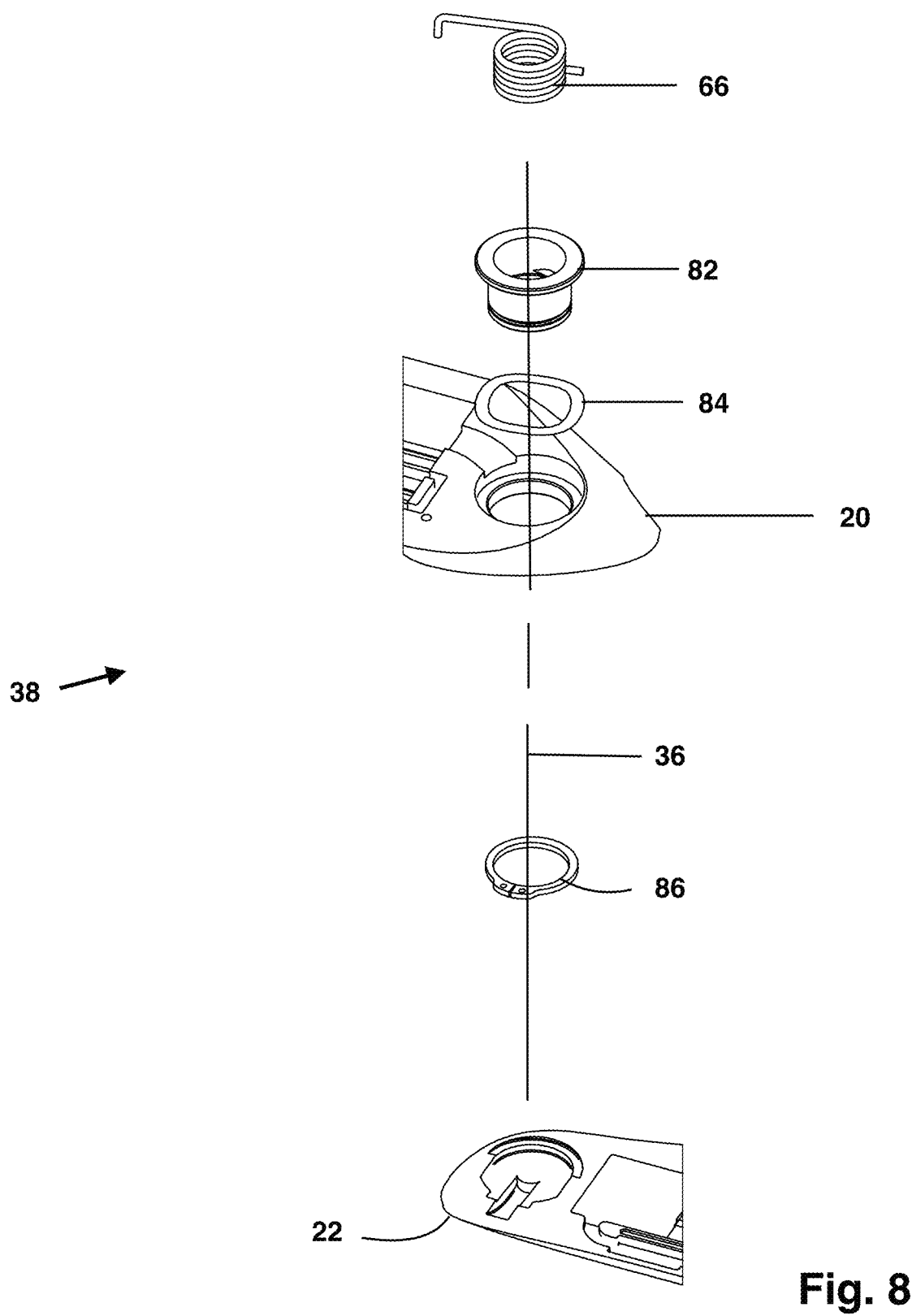

FIG. 8 is an exploded view of a span hinge.

FIG. 9 is a top view of the UAV showing section line A-A.

FIG. 10 is a cross sectional view of the UAV in the deployed condition through section line A-A.

Figure 11:
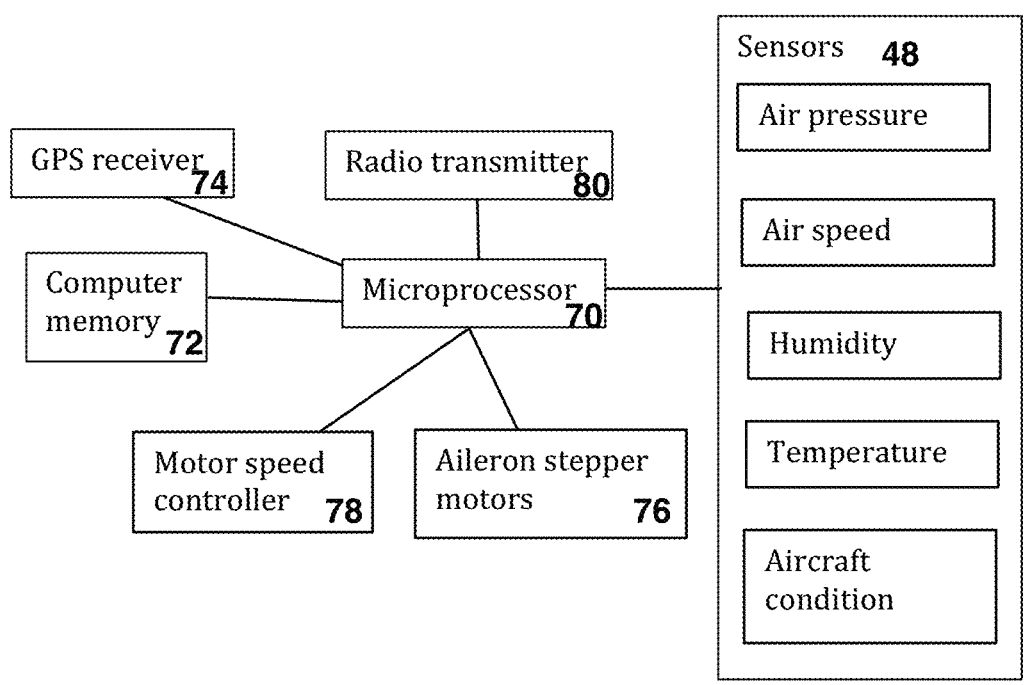

FIG. 11 is a schematic view of the control system.

Figure 12:
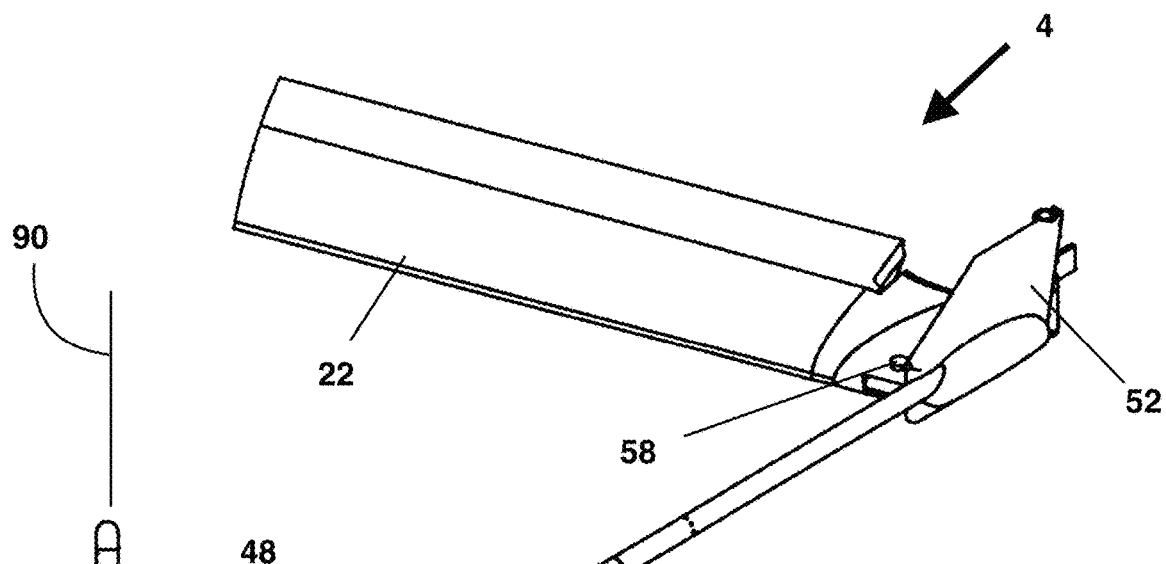

FIG. 12 is a perspective view of the port tip portion and winglet in the deployed condition.

Figure 13:
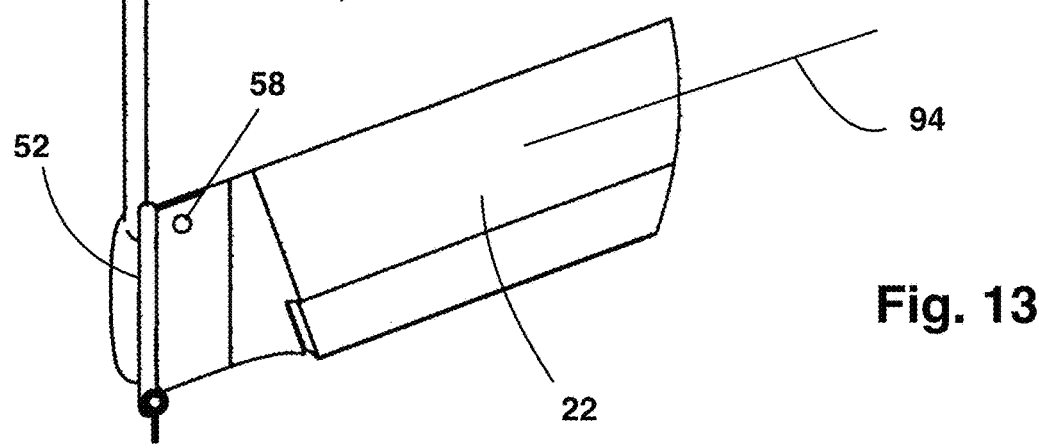

FIG. 13 is a top view of the port tip portion and winglet in the deployed condition.

Figure 14:
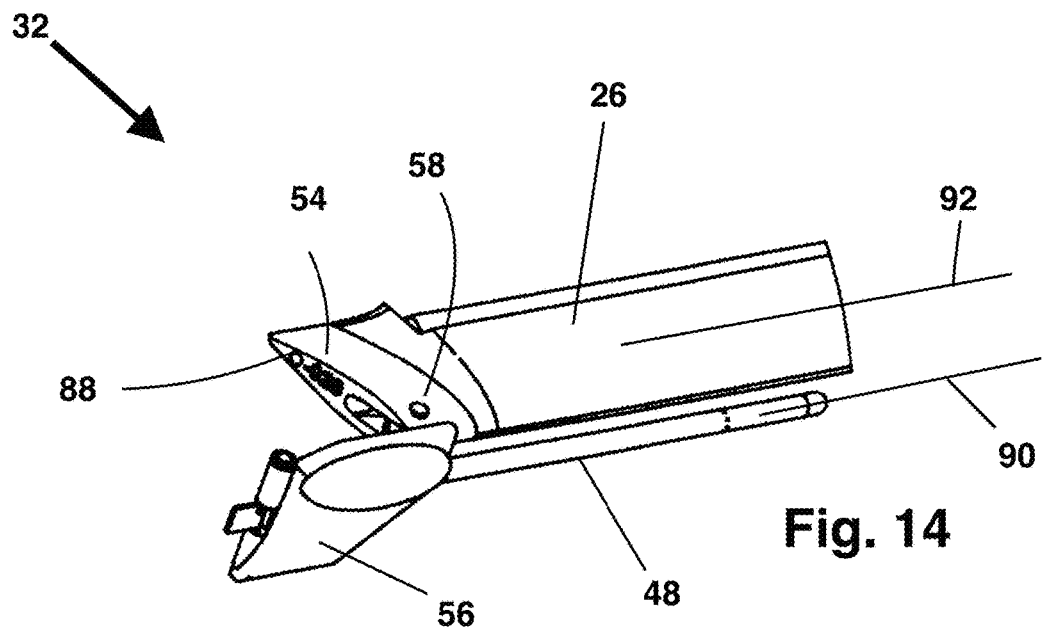

FIG. 14 is a perspective view of the starboard tip portion and winglet in the stowed condition.

Figure 15:
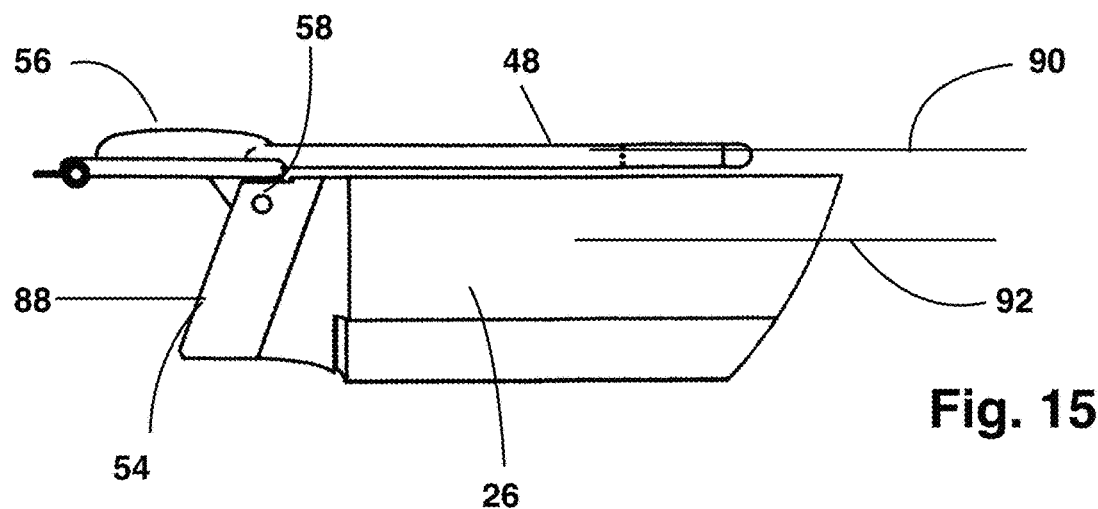

FIG. 15 is a top view of the starboard tip portion and winglet in the stowed condition.

Figure 16:
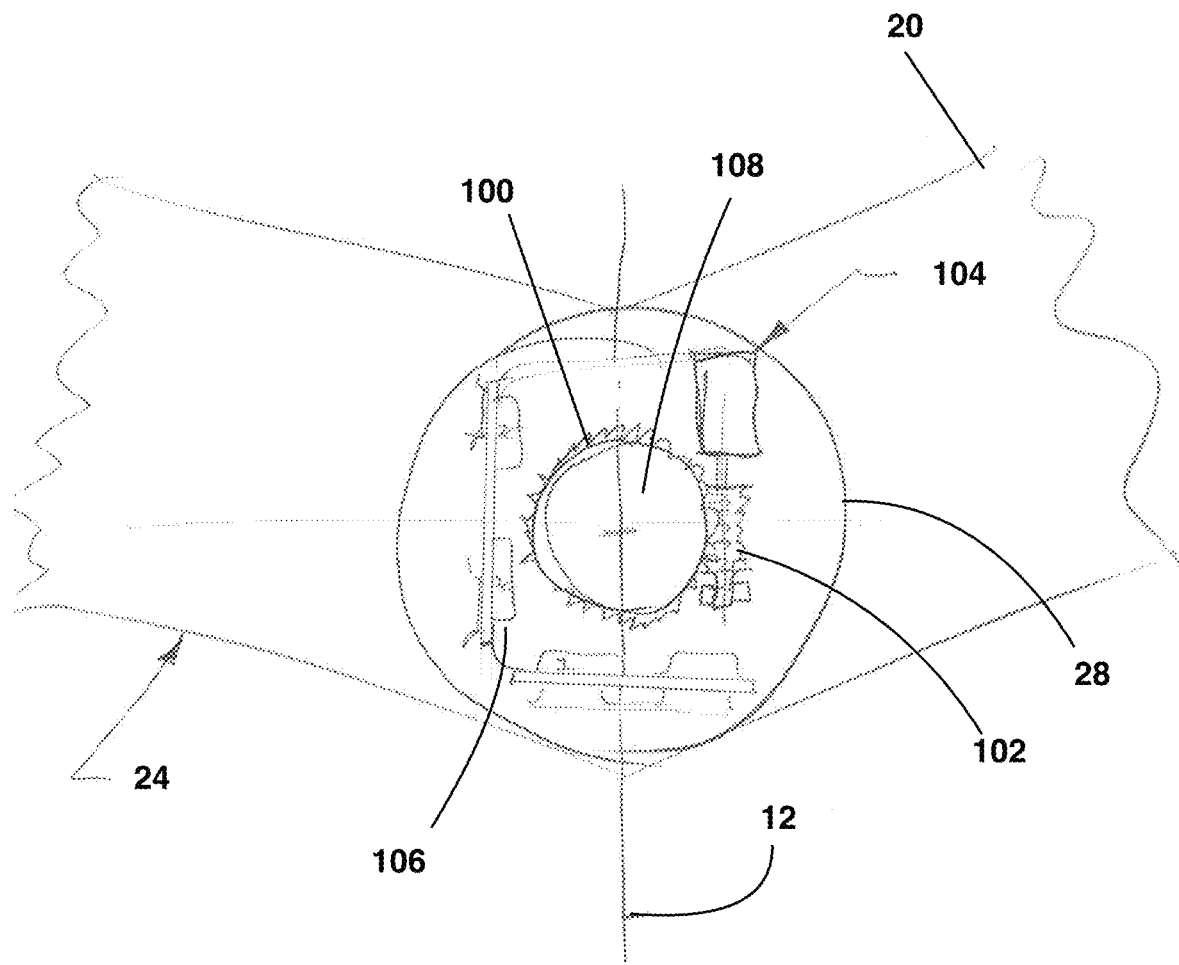

FIG. 16 is a tip cutaway view of the root hinge of a camera-carrying embodiment.

Figure 17:
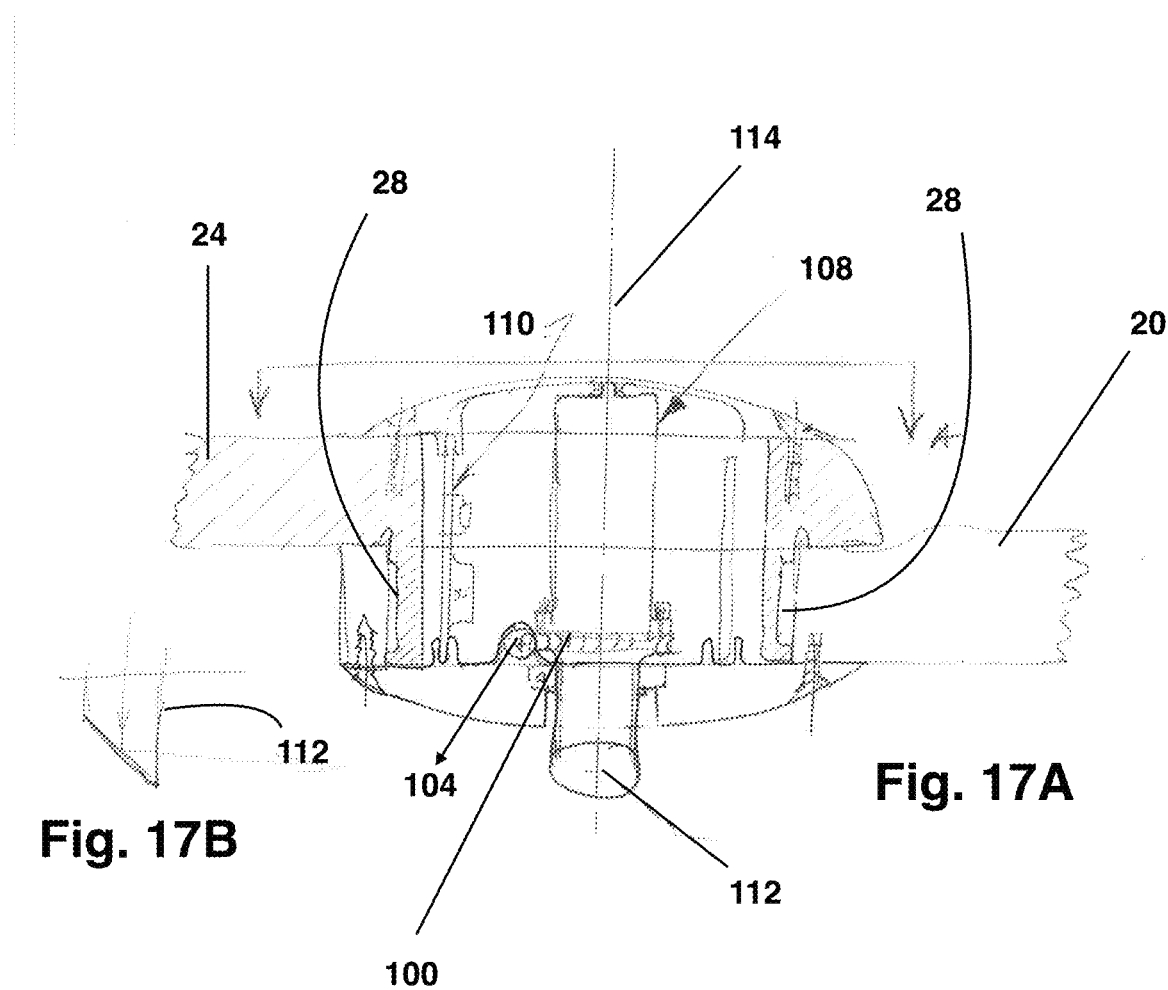

FIG. 17A is a section front view of the camera-carrying embodiment of FIG. 16.

FIG. 17B is a detail of an angled mirror.

Figure 18:
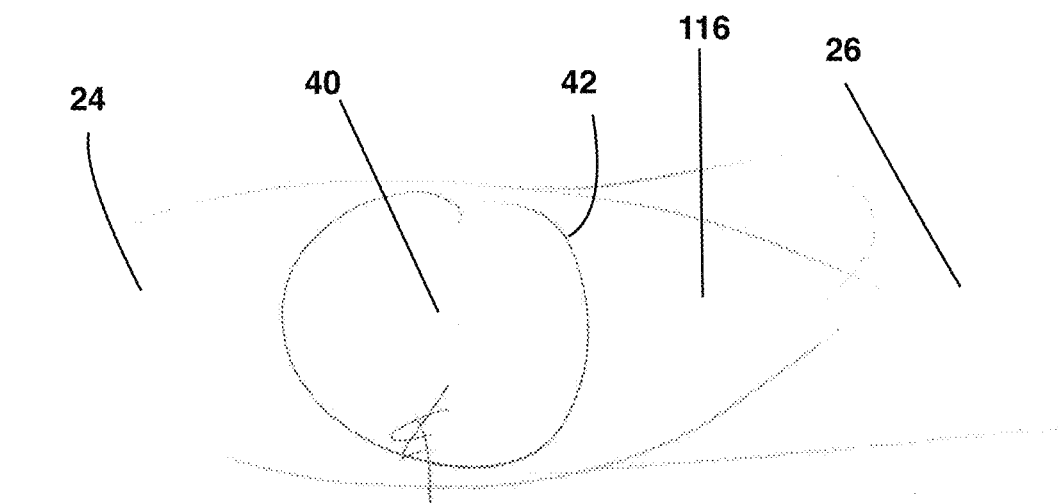

FIG. 18 is a schematic top view of a span hinge with a structural fairing.

Figure 19:
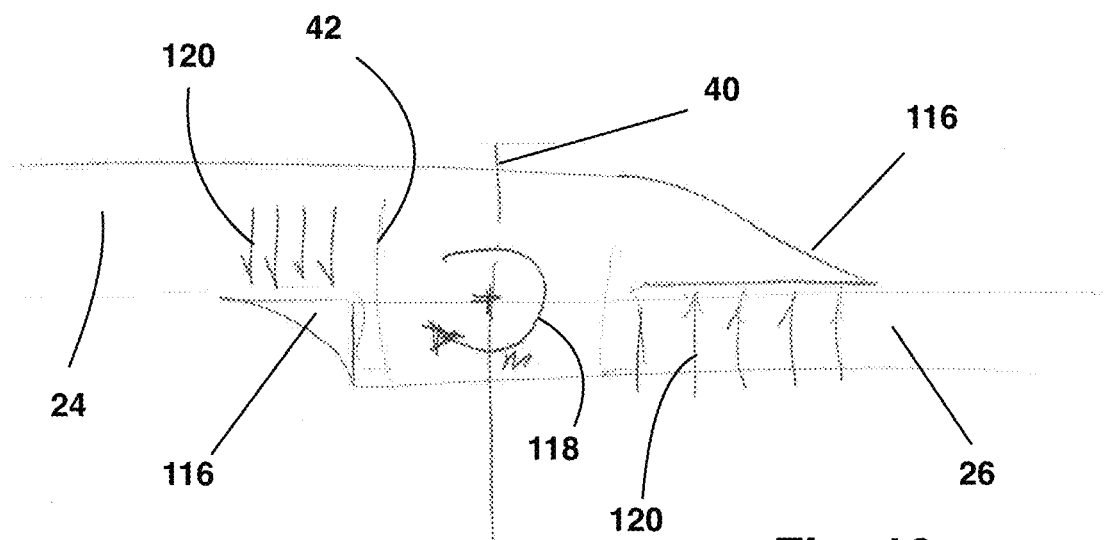

FIG. 19 is a section front view of a span hinge with structural fairings.

IV. DESCRIPTION OF AN EMBODIMENT

Figure 5:
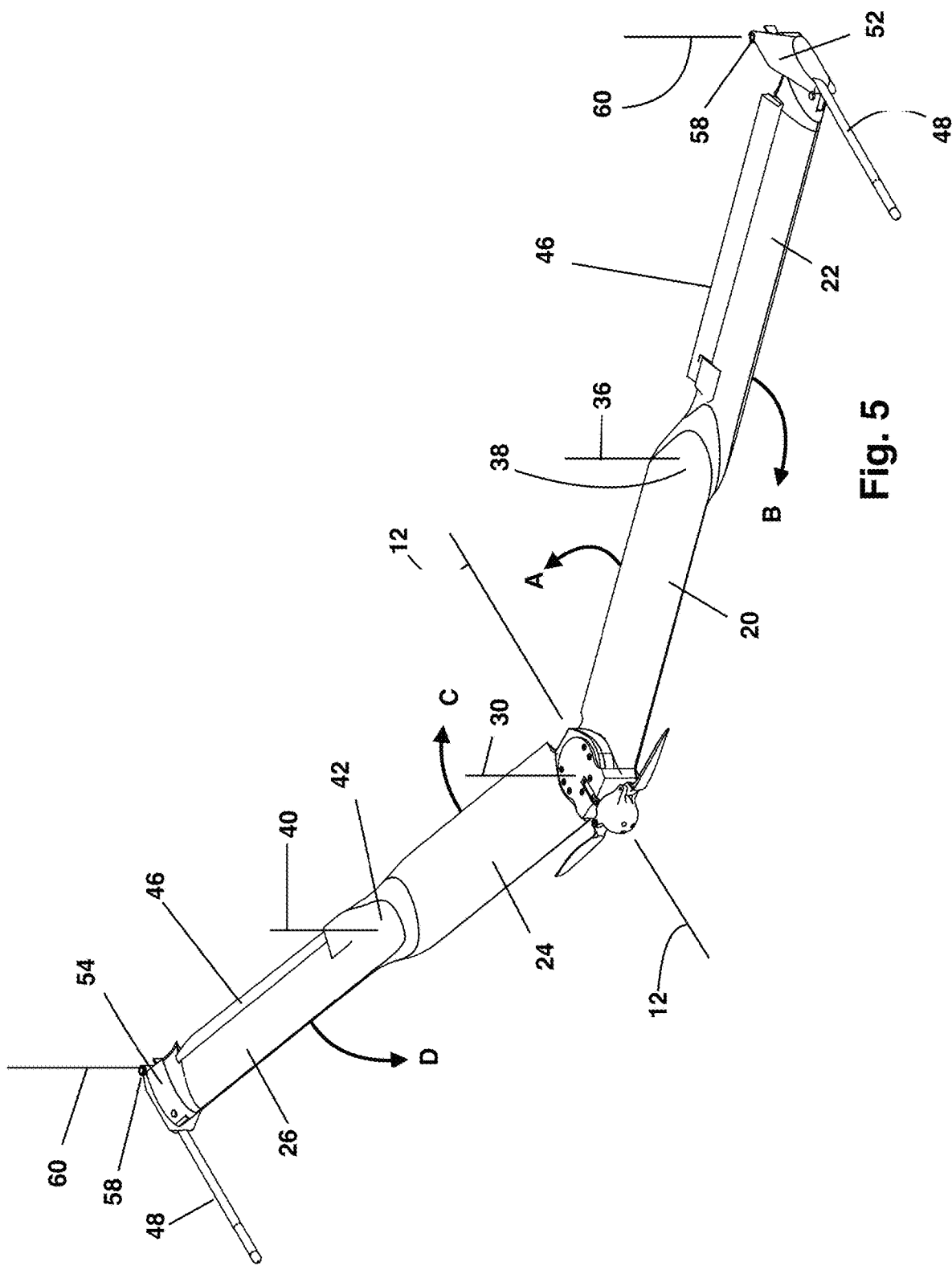
FIG. 5 is a perspective view of the UAV in the deployed condition.

FIGS. 1, 2 and 5 show the foldable wing UAV 2 of the Invention in the 5 condition 4. A nacelle 6 houses an electric motor 8. The motor 8 has an axis of rotation 10 that is coextensive with the longitudinal axis 12 of the UAV 2. The electric motor 8 drives a propeller 14. The propeller 14 may be folding. When the propeller 14 is rotating under power from the electric motor 8, the propeller 14 provides thrust in the forward direction along the longitudinal axis 12.

The UAV 2 has a port wing 16 and a starboard wing 18. The wings 16, 18 are foldable between a deployed condition 4, shown by FIGS. 1, 2 and 5, and a folded condition 32, shown by FIGS. 3 and 4. The port wing 16 has a port root portion 20 and a port tip portion 22. The starboard wing 18 has a starboard root portion 24 and a starboard tip portion 26.

The port root portion 20 and the starboard root portion 24 are hinged to rotate about a root hinge 28 between the deployed condition 4 shown by FIGS. 1, 2 and 5 and the folded condition 32 shown by FIGS. 3 and 4. The root hinge 28 defines a root hinge axis of rotation 30 about which the port root portion 20 and the starboard root portion 24 rotate. When the port root portion 20 and the starboard root portion 24 are in the deployed condition 4, the folded condition 32 and any position between the deployed and folded conditions 4, 32, the mathematical surfaces defined by the chords 34 of the port root portion 20 and the starboard root portion 24 are generally parallel.

For the port wing 16, the port tip portion 22 is configured to rotate about a port span axis of rotation 36 defined by a port span hinge 38 between the folded condition 32 (FIGS. 3 and 4) and the deployed position 4 (FIGS. 1, 2 and 5). In a similar manner, for the starboard wing 18, the starboard tip portion 26 is configured to rotate about a starboard span axis of rotation 40 defined by a starboard span hinge 42 between the folded condition 32 (FIGS. 3 and 4) and the deployed position 4 (FIGS. 1, 2 and 5). The mathematical surfaces defined by the chords 34 of the port root portion 20, the port tip portion 22, the starboard root portion 24 and the starboard tip portion 26 are generally parallel in the deployed condition 4, the folded condition 32, and in any position between the deployed and folded conditions 4, 32.

The chords 34 of the root portions 20, 24 and the tip portions 22, 26 may not define mathematical planes because a twist may be needed along the span of the wings 14, 16 to maintain pitch stability. Nonetheless, the mathematical surfaces defined by the chords 34 of the root portions 20, 24 and the tip portions 22, 26 are generally parallel for the deployed and folded conditions 4, 32 and for each condition intermediate to the deployed and folded conditions 4, 32.

FIG. 5 shows the direction of rotation of the port and starboard root portions 20, 24 about the root hinge axis of rotation 30, as indicated by the arrows marked 'A' (port root portion 20) and 'C' (starboard root portion 24) when the port and starboard root portions 20, 24 are moving from the deployed condition 4 to the folded condition 32. The arrow marked 'B' on FIG. 5 shows the direction of rotation of the port tip portion 22 about the port span axis of rotation 36 when the port tip portion 22 is moving to the folded condition 32. The arrow marked 'D' on FIG. 5 shows the direction of rotation of the starboard tip portion 26 about the starboard span axis of rotation 40 when the starboard tip portion 26 is moving to the folded condition 32.

From FIGS. 1, 2, 4, 5 and 6, the wings 16, 18 may feature winglets 52, 56. The port wing tip 50 may feature a port winglet 52 and the starboard wing tip 54 may feature a starboard winglet 56. The winglets 52, 56 acts as vertical stabilizers and reduce tip losses. Where the starboard tip portion 26 is configured to be higher than the port tip portion 22 in straight and level coordinated flight, the starboard winglet 56 extends in the downward direction from the starboard tip portion 26 and the port winglet 52 extends upward from the port tip portion 22. Providing that the winglets 52, 56 extend in opposite directions provides that the UAV 2 is compact in the folded condition 32, shown by FIGS. 3 and 4.

The port and starboard winglets 52, 56 are rotatable about winglet axes of rotation 58 defined by winglet hinges 60 between the folded condition 32 and the deployed condition 4. One or more sensors 48, such as the pitot tubes illustrated by FIGS. 2-6 may be attached to and may rotate with the winglets 52, 56 between the folded condition 32 and the deployed condition 4 so that the UAV 2 is compact when in the folded condition 32. The sensors 48 may detect any meteorological condition that the user may find useful, such as air temperature, pressure, speed, and humidity.

FIG. 6 is a partial cutaway view of the UAV 2. The UAV 2 systems and motor 8 operate on electricity provided by electrical storage batteries 62 disposed within the wings 16, 18. A pair of extension coil springs 64 under tension pull the port root portion 20 and the starboard root portion 24 to the deployed condition 4 from the folded condition 32. A pair of torsion springs 66 uncoil to urge the port tip portion 22 and the starboard tip portion 26 to the deployed condition 4 from the folded condition 32. The winglets 52, 56 may move from the folded condition 32 to the deployed condition 32 by inertia due to the motion imparted to the port and starboard tip portions 22, 26 by the torsion springs 66 and the extension coil springs 64. Alternatively, the winglets 52,56 may be urged to the deployed condition 4 by a torsion spring.

FIG. 7 is a detail cutaway view of the nacelle 6 and port and starboard root portions 20, 24. The port and starboard root portions 20, 24 rotate about the root hinge axis of rotation 30 defined by the root hinge 28. A pair of coil springs 64 in tension act through cables 65 to pull the port and starboard root portions 20, 24 from the folded condition 32 to the deployed condition 4. FIG. 7 shows storage batteries 62 in the wings 16, 18.

FIG. 8 is an exploded view of the port span hinge 38 joining the port root portion 20 and the port tip portion 22 for rotation about the port span axis of rotation 36. Barrel 82 penetrates port root portion 20. Wave spring 84 allows the barrel 82 to rotate with respect to the port root portion 20. Snap ring 86 retains port tip portion 22 to the barrel 82. A torsion spring 66 is disposed inside the barrel 82 and engages both the port root portion 20 and the port tip portion 22 to urge the port wing 16 to the deployed position 4. The starboard span hinge 42 is a mirror image of the port span hinge 38. The torsion spring 66 is pretensioned to hold the wing open against aerodynamic drag in flight.

FIG. 10 is a cross section of the starboard span hinge 42 through section line A-A of FIG. 9. FIG. 10 shows the assembled starboard root and tip portions 24, 26, the barrel 82 with the torsion spring 66 inside the barrel, wave spring 84 separating the barrel 82 from the starboard tip portion 26 and the snap ring 86 attaching the starboard root portion 24 to the barrel 82. Wave spring 84 pretensions the wing joint axially to allow assembly and minimize the gap between the inner and outer wings.

FIG. 11 is a detail of a winglet 52, 56 showing the winglet hinge 58 and the winglet axis of rotation 60. The winglets 52, 56 may not depend upon winglet springs to urge the winglets to the deployed position 4 from the folded position 32. Instead, the winglets 52, 56 may rely upon a combination of inertia and aerodynamic forces. When the force of the extension coil springs 64 and the torsion springs 66 accelerate the port root and tip portions 20, 22 and the starboard root and tip portions 24, 26 to the deployed condition 4 from the folded condition 32, the springs 64, 66 also accelerate the winglets 52, 56, imparting inertia to the winglets 52, 56. When the root and tip portions 20, 22, 24, 26 hit their corresponding stops, the root and tip portions 20, 22, 24, 26 stop moving. The winglets 52, 56 continue to move because of their inertia to the deployed condition 4. The aerodynamic forces of moving air over the winglets 52, 56 also urges the winglets 52, 56 to the deployed position. When the winglets 52, 56 reach the deployed position, corresponding magnets 88 in each winglet 52, 56 and wing tip 50, 54 mutually attract, retaining the winglets 52, 56 in the deployed position 4.

Any other suitable mechanism may be used to move and retain the winglets 52, 56 to the deployed position, including springs such as torsion, compression, coil, air, leaf, involute, elastomer, or any other suitable springs, a connecting rod or cable connecting the winglet 52, 56 to the corresponding root portion 20, 24, or any other suitable mechanism known in the art.

From FIG. 6, the control system 68 may be located on the UAV 2 in any available space, such as in the nacelle 6 behind the propeller 14, within the wings 16, 18 or in the winglets 52, 56. FIG. 12 is a schematic diagram of the control system 68 of the UAV 2. A microprocessor 70 is operably attached to computer memory 72. The computer memory 72 stores instructions to direct the microprocessor 70 to fly the UAV 2 on a pre-determined flight path. The microprocessor 70 is operably connected to a global positioning system ('GPS') receiver 74 to inform the microprocessor 70 as to the location of the UAV 2. The microprocessor 70 is configured to control aileron stepper motors 76 that selectably control the position of the ailerons 46. The microprocessor 70 is also configured to control the electric motor 8, to turn the motor 8 on and off and, if required, to control the speed of rotation of the electric motor 8 through a motor speed controller 78.

The microprocessor 70 is also operably connected to a radio transmitter 80 and to one or more sensors 48. The control system 68 is configured to receive sensor signals from one or more sensors 48 and to transmit those sensor signals over the radio transmitter 80 to a remote receiver. The microprocessor 70 also may transmit the UAV 2 position as detected by the GPS receiver 74, and may transmit aircraft condition information, such as the storage battery state of charge, UAV 2 altitude, motor 8 speed, aileron 46 position, and any other information that a user may find useful. Radio and GPS antennae may be disposed on opposing sides of the nacelle 6.

The UAV 2 may be equipped with one or more still or video cameras, not shown. The control system 68 may be configured to transmit photographs or video by the radio transmitter 80 to the remote receiver.

Rather than the extension coil springs 64 and torsion springs 66 described above to move the root portions 20, 24 and tip portions 22, 26 to the deployed position 4, any other suitable mechanism or combination of mechanisms may be used to move and retain the root and tip portions 20, 22, 24, 26 to the deployed position 4, including springs such as torsion, compression, coil, air, leaf, involute, elastomer, or any other suitable springs, or any other suitable mechanism known in the art. A single spring or a pair of springs may move more that one of the root and tip portions 20, 22, 24, 26 to the deployed position, such as one or more extension coil springs acting on cables 65. Any other suitable mechanism may be used, such as electrical motors or motors powered by a compressed gas.

FIGS. 12 and 13 show the port tip portion 22 and the port winglet 52 in the deployed condition 4. FIGS. 14 and 15 show the starboard tip portion 26 and starboard winglet 56 in the stowed condition 32. Port and starboard winglets 52, 56 rotate about winglet hinges 58 between the stowed and deployed positions 4, 32. Winglet hinges 58 are located at the port and starboard wing tips 50, 54. When the root portion spring 64 or the tip portion spring 66 propels the port or starboard root portion 20, 24 and the port or starboard tip portion 22, 26 from the stowed position 4 to the deployed position 32, the springs 64, 66 impart momentum to the port and starboard root and tip portions 22, 26. The port and starboard root and tip portions 22, 26 and the port and starboard winglets 52, 56 are configured so the that port and starboard tip portions 22, 26 impart momentum to the port and starboard winglets 52, 56, respectively. The momentum imparted to the port and starboard winglets 52, 56 may move the port and starboard winglets 52, 56 from the stowed position 4 to the deployed position 32 without additional motive force. Alternatively, the port and starboard winglets 52, 56 may include winglet springs to move the winglets 52, 56 to the deployed position 42. When the port and starboard winglets 52, 56 reach the deployed position 32, magnets 88 may retain the winglets 52, 56 in the deployed position 32.

FIGS. 16, 17A and 17B illustrate an embodiment equipped with a camera 108 and rotatable mirror 112 located within the root hinge 28. FIG. 16 is a cutaway plan view showing the area of the root hinge 28. FIG. 17A is a front section view of the air vehicle 2 of FIG. 16, also showing the area of the root hinge 28. FIG. 17B is a detail of a rotatable mirror 112. In the embodiment of FIGS. 16, 17A and 17B, a camera 108 is located within the root hinge 28. The camera 108 may be, for example, based on a charge-coupled device, or CCD. The camera 108 is pointed downward when the aerial vehicle 2 is in straight and level flight. The camera 108 looks through an angled mirror 112. The camera 108, or the camera 108 and the angled mirror 112, may be rotated by a servo motor 104 driving a worm gear 102 and a ring gear 100. The camera 108 with the mirror 112 may view 360 degrees about the aerial vehicle 2 by rotating the mirror 108 or by rotating the combination of the mirror 108 and camera 104. The servo motor 104 and the camera 108 are controlled by a camera controller 110 and motor controller 106 that operate under the control of the microprocessor 70.

FIGS. 18 and 19 illustrate the starboard span hinge 42. FIG. 18 is a top view of the starboard span hinge 42 showing structural fairing 116 on the top side of the starboard root portion 24 at the starboard span hinge 42 and on the bottom side of the starboard tip portion 26 at the starboard span hinge 42. The structural fairing smooths turbulent airflow over the starboard wing 18 at the starboard span hinge 42 resulting from the stepped relationship of the starboard root and tip portions 24, 26.

The structural fairing 116 also provides a larger bearing area for the starboard span hinge 42 and prevents excessive flexing and changes in dihedral of the starboard wing 18 at the starboard span hinge 42. Flexing movements at the starboard span hinge 42 are represented by arrow 118 and are resisted by moments resulting from forces on the structural fairing represented by arrows 120. As a result, the structural fairing both smooths the airflow and strengthens the starboard wing 18. Although FIGS. 18 and 19 are described above in terms of the starboard wing 18, they apply equally to the port wing 16.

The following are a list of numbered elements shown on the drawings and described in the specification.

Foldable wing UAV 2
Deployed condition 4
Nacelle 6
Electric motor 8
Axis of rotation 10
Longitudinal axis 12
Propeller 14
Port wing 16
Starboard wing 18
Port root portion 20
Port tip portion 22
Starboard root portion 24
Starboard tip portion 26
Root hinge 28
Root hinge axis of rotation 30
Folded condition 32
Chord 34
Port span axis of rotation 36
Port span hinge 38
Starboard span axis of rotation 40
Starboard span hinge 42
Chord 44
Ailerons 46
Sensor 48
Port wing tip 50
Port winglet 52
Starboard wing tip 54
Starboard winglet 56
Winglet hinge 58
Winglet axis of rotation 60
Storage batteries 62
Extension coil springs or root portion spring 64
Cable 65
Torsion springs or tip portion spring 66
Control system 68
Microprocessor 70
Computer memory 72
GPS receiver 74
Aileron stepper motors 76
Motor speed controller 78
Radio transmitter 80
Barrel 82
Wave spring 84
Snap ring 86
Magnets 88
sensor axis 90
port root portion span axis 92 port tip portion span axis 94
starboard root portion span axis 96
starboard tip portion span axis 98
ring gear 100
worm gear 102
servo motor 104
motor controller 106
camera 108
camera controller 110
rotatable mirror 112
root hinge axis of rotation 114
structural fairing 116
118 arrow representing bending moments
120 arrows representing forces resisting the bending moments

What is claimed is:

1. An unmanned aerial vehicle defining a longitudinal axis, the vehicle comprising:
   a) A port wing defined by a port root portion and a port tip portion, the port root portion and port tip portion being rotatably attached by a port span hinge;
   b) a starboard wing defined by a starboard root portion and a starboard tip portion, the starboard root portion and the starboard tip portion being rotatably attached by a starboard span hinge;
   c) a root hinge, the port root portion and the starboard root portion being rotatably attached by the root hinge, each of the port and starboard root portions and tip portions defining a span axis, the port root portion and port tip portion being rotatable about the port span hinge and about the root hinge between a deployed condition and a stowed condition, the starboard root portion and starboard tip portion being rotatable about the starboard span hinge and about the root hinge between the deployed condition and the stowed condition;
   d) when the port and starboard root and tip portions are in the stowed condition the span axes of the port and starboard root portions and tip portions are parallel to the longitudinal axis;
   e) when the port wing is in the deployed condition the span axes of the port root portion is parallel to the span axis of the port tip portion, when the starboard wing is in the deployed condition the span axis of the starboard root portion is parallel to the span axis of the starboard tip portion, and when the port and starboard wings are in the deployed condition the port and starboard tip portions are in a spaced apart relation and separated by the port and starboard root portions to define a flying wing, wherein the port tip portion defines a port wing tip and the starboard tip portion defines a starboard wing tip;
   f) a port winglet, the port winglet being rotatably attached to the port wing tip by a port winglet hinge, the port winglet being rotatable between the stowed condition and the deployed condition about the port winglet hinge;
   g) a starboard winglet, the starboard winglet being rotatably attached to the starboard wing tip by a starboard winglet hinge, the starboard winglet being rotatable between the stowed condition and the deployed condition about the starboard winglet hinge, each of the port and starboard winglets defining a winglet chord, the port winglet chord and starboard winglet chord being parallel to the longitudinal axis when the port and starboard winglets are in the deployed condition, wherein the vehicle is configured so that the vehicle is not symmetrical about the longitudinal axis and so that when the vehicle is flying in a level condition in a direction parallel to the longitudinal axis the port winglet extends downward from the port wing tip, the port tip portion span axis is above the port root portion span axis, the port root portion span axis is above the starboard root portion span axis, the starboard root portion span axis is above the starboard tip portion span axis, and the starboard winglet extends upward from the starboard wing tip.

2. The unmanned aerial vehicle of claim 1, the vehicle further comprising: an elongated sensor, the elongated sensor defining a sensor axis, the elongated sensor being attached to and rotatable with the port winglet between the deployed and the stowed conditions, the sensor axis being parallel to the longitudinal axis when the port winglet is in the deployed condition, the sensor axis being parallel to the longitudinal axis when the port winglet is in the stowed condition.

3. The unmanned aerial vehicle of claim 2, the vehicle further comprising:
   a) a root portion spring, the root portion spring being configured to move the port or starboard root portion from the stowed condition to the deployed condition;
   b) a tip portion spring, the tip portion spring being configured to move the port or starboard tip portion from the stowed to the deployed condition with respect to the corresponding port or starboard root portion, the root portion spring or the tip portion spring being configured to impart a momentum to the port or starboard tip portion as the port or starboard tip portion moves from the stowed condition to the deployed condition, the port or starboard tip portion being configured to impart momentum to the corresponding port or starboard winglet, the corresponding port or starboard winglet being configured so that the momentum moves the port or starboard winglet from the stowed condition to the deployed condition.

4. The unmanned aerial vehicle of claim 3, the vehicle further comprising: a magnet, the magnet being configured to retain the port or starboard winglet in the deployed condition.

5. The unmanned aerial vehicle of claim 1 wherein the vehicle is configured so that then the port and starboard wings are in the stowed condition the port winglet extends downward from the port wing tip, the port tip portion span axis is above the port root portion span axis, the port root portion span axis is above the starboard root portion span axis, the starboard root portion span axis is above the starboard tip portion span axis, and the starboard winglet extends upward from the starboard wing tip.

6. The air vehicle of claim 1, the vehicle further comprising:
   a) a camera, the root hinge defining an interior volume, the camera being disposed within the interior volume;
   b) an angled mirror, the camera being configured so that light entering the camera is reflected from the angled mirror.

7. The air vehicle of claim 6, the vehicle further comprising: a motor drive having a configuration to selectably rotate the angled mirror or the camera and the angled mirror, the motor drive configured to provide a selectable field of view to the camera.

8. The air vehicle of claim 7, the motor drive comprising a servo motor selectably operating under the control of a motor controller and the microprocessor, the servo motor being configured to rotate a worm gear, the worm gear engaging a ring gear, the ring gear being attached to the angled mirror or the camera, the worm gear being configured to rotate the angled mirror or the camera and the angled mirror.

9. The air vehicle of claim 1 wherein the starboard root portion defines a root portion structural fairing at the starboard span hinge and wherein the starboard tip portion defines a tip portion structural fairing at the starboard span hinge, the root portion structural fairing being configured to fair the starboard root portion into the starboard tip portion, the tip portion structural fairing being configured to fair the starboard tip portion into the starboard root portion, the tip portion and root portion structural fairings being configured to resist a bending moment of the starboard wing.

10. The air vehicle of claim 1 wherein the port root portion defines a root portion structural fairing at the port span hinge and wherein the port tip portion defines a tip portion structural fairing at the port span hinge, the root portion structural fairing being configured to fair the port root portion into the port tip portion, the tip portion structural fairing being configured to fair the port tip portion into the port root portion, the tip portion and root portion structural fairings being configured to resist a bending moment of the port wing.

11. An unmanned aerial vehicle defining a longitudinal axis, the vehicle comprising:
 a) A port wing defined by a port root portion and a port tip portion, the port root portion and port tip portion being rotatably attached by a port span hinge;
 b) a starboard wing defined by a starboard root portion and a starboard tip portion, the starboard root portion and the starboard tip portion being rotatably attached by a starboard span hinge;
 c) a root hinge, the port root portion and the starboard root portion being rotatably attached by the root hinge, each of the port and starboard root portions and tip portions defining a span axis, the port root portion and port tip portion being rotatable about the port span hinge and about the root hinge between a deployed condition and a stowed condition, the starboard root portion and starboard tip portion being rotatable about the starboard span hinge and about the root hinge between the deployed condition and the stowed condition;
 d) when the port and starboard root and tip portions are in the stowed condition the span axes of the port and starboard root portions and tip portions are parallel to the longitudinal axis;
 e) when the port wing is in the deployed condition the span axes of the port root portion is parallel to the span axis of the port tip portion, when the starboard wing is in the deployed condition the span axis of the starboard root portion is parallel to the span axis of the starboard tip portion, and when the port and starboard wings are in the deployed condition the port and starboard tip portions are in a spaced apart relation and separated by the port and starboard root portions to define a flying wing, wherein the port tip portion defines a port wing tip and the starboard tip portion defines a starboard wing tip;
 f) a port winglet, the port winglet being rotatably attached to the port wing tip by a port winglet hinge, the port winglet being rotatable between the stowed condition and the deployed condition about the port winglet hinge;
 g) a starboard winglet, the starboard winglet being rotatably attached to the starboard wing tip by a starboard winglet hinge, the starboard winglet being rotatable between the stowed condition and the deployed condition about the starboard winglet hinge, each of the port and starboard winglets defining a winglet chord, the port winglet chord and starboard winglet chord being parallel to the longitudinal axis when the port and starboard winglets are in the deployed condition, wherein the vehicle is configured so that the vehicle is not symmetrical about the longitudinal axis and so that when the vehicle is flying in a level condition in a direction parallel to the longitudinal axis the starboard winglet extends downward from the starboard wing tip, the starboard tip portion span axis is above the starboard root portion span axis, the starboard root portion span axis is above the port root portion span axis, the port root portion span axis is above the port tip portion span axis, and the port winglet extends upward from the port wing tip.

12. The unmanned aerial vehicle of claim 11 wherein the vehicle is configured so that then the port and starboard wings are in the stowed condition the starboard winglet extends downward from the starboard wing tip, the starboard tip portion span axis is above the starboard root portion span axis, the starboard root portion span axis is above the port root portion span axis, the port root portion span axis is above the port tip portion span axis, and the port winglet extends upward from the port wing tip.

13. The air vehicle of claim 11, the vehicle further comprising:
 a) a camera, the root hinge defining an interior volume, the camera being disposed within the interior volume;
 b) an angled mirror, the camera being configured so that light entering the camera is reflected from the angled mirror.

14. The air vehicle of claim 13, the vehicle further comprising: a motor drive having a configuration to selectably rotate the angled mirror or the camera and the angled mirror, the motor drive configured to provide a selectable field of view to the camera.

15. The air vehicle of claim 14, the motor drive comprising a servo motor selectably operating under the control of a motor controller and the microprocessor, the servo motor being configured to rotate a worm gear, the worm gear engaging a ring gear, the ring gear being attached to the angled mirror or the camera, the worm gear being configured to rotate the angled mirror or the camera and the angled mirror.

16. The air vehicle of claim 11 wherein the starboard root portion defines a root portion structural fairing at the starboard span hinge and wherein the starboard tip portion defines a tip portion structural fairing at the starboard span hinge, the root portion structural fairing being configured to fair the starboard root portion into the starboard tip portion, the tip portion structural fairing being configured to fair the starboard tip portion into the starboard root portion, the tip portion and root portion structural fairings being configured to resist a bending moment of the starboard wing.

17. The air vehicle of claim 11 wherein the port root portion defines a root portion structural fairing at the port span hinge and wherein the port tip portion defines a tip portion structural fairing at the port span hinge, the root portion structural fairing being configured to fair the port root portion into the port tip portion, the tip portion structural fairing being configured to fair the port tip portion into the port root portion, the tip portion and root portion structural fairings being configured to resist a bending moment of the port wing.

18. The unmanned aerial vehicle of claim 11, the vehicle further comprising: an elongated sensor, the elongated sensor defining a sensor axis, the elongated sensor being attached to and rotatable with the port winglet between the deployed and the stowed conditions, the sensor axis being parallel to the longitudinal axis when the port winglet is in the deployed condition, the sensor axis being parallel to the longitudinal axis when the port winglet is in the stowed condition.

19. The unmanned aerial vehicle of claim 18, the vehicle further comprising:
  a) a root portion spring, the root portion spring being configured to move the port or starboard root portion from the stowed condition to the deployed condition;
  b) a tip portion spring, the tip portion spring being configured to move the port or starboard tip portion from the stowed to the deployed condition with respect to the corresponding port or starboard root portion, the root portion spring or the tip portion spring being configured to impart a momentum to the port or starboard tip portion as the port or starboard tip portion moves from the stowed condition to the deployed condition, the port or starboard tip portion being configured to impart momentum to the corresponding port or starboard winglet, the corresponding port or starboard winglet being configured so that the momentum moves the port or starboard winglet from the stowed condition to the deployed condition.

20. The unmanned aerial vehicle of claim 19, the vehicle further comprising: a magnet, the magnet being configured to retain the port or starboard winglet in the deployed condition.

\* \* \* \* \*